United States Patent [19]

Tanaka et al.

[11] Patent Number: 4,535,009

[45] Date of Patent: Aug. 13, 1985

[54] METHOD FOR PRODUCING A COMPOSITE SHEET MATERIAL

[76] Inventors: Minoru Tanaka, 1419, Oaza Godo, Godo-cho, Ampachi-gun, Gifu-ken; Hideo Nakamura, 106, Yashima-cho, Ogaki-shi, Gifu-ken; Shunji Mizuguchi, 5-21, Shimizu-cho, Nishinomiya-shi, Hyogo-ken, all of Japan

[21] Appl. No.: 554,212

[22] Filed: Nov. 22, 1983

[30] Foreign Application Priority Data

Nov. 24, 1982 [JP] Japan ................................. 57-204535

[51] Int. Cl.³ .......................... B05D 3/10; B05D 3/12; B05D 5/00
[52] U.S. Cl. .................................... 427/246; 427/341; 427/342; 427/368
[58] Field of Search ............ 427/246, 341, 342, 393.5, 427/368, 244; 428/91

[56] References Cited

U.S. PATENT DOCUMENTS 4,302,493  11/1981  Tanaka et al. ........................ 428/91

Primary Examiner—Evan K. Lawrence

[57] ABSTRACT

A method of providing a composite sheet material which has soft and pliable hand characteristics, despite being dense, and also high resistance against discoloration and deterioration. The method comprises impregnating and/or coating a fibrous sheet with a mixture of (A) a polyurethane elastomer containing a sterically hindered amino group within its molecular chain, (B) a compound selected from the group consisting of a polybasic acid and its halide, metal salt and ammonium salt, wherein one or more hydrogen atoms remain unreacted, which amount of (B) is within the range of 0.8-5 molar equivalents relative to the sterically hindered amino group, and (C) a solvent for the polyurethane elastomer (A), and subjecting the resulting material to wet coagulation.

17 Claims, No Drawings

METHOD FOR PRODUCING A COMPOSITE SHEET MATERIAL

This invention relates to a novel method for producing a composite sheet material comprising a fibrous sheet and a polyurethane elastomer.

In U.S. Pat. No. 3,899,292, we have heretofore disclosed synthetic leathers comprising superfine filaments or fibers obtained from so-called islands-in-sea type multicomponent filaments or fibers together with a specific polyurethane elastomer. It is well known that the synthetic suede obtained by the methods described above has earned an excellent reputation in the textile art, and has become a well-known apparel material under the trademark "ULTRASUEDE". It has excellent qualities such as fine naps which give a graceful appearance, a supple touch, ease of handling, adaptability to a wide color variety, good color fastness, lightness and a high manufacturing yield.

In addition to the excellent qualities as described above, it is still further desired to obtain a composite sheet material which satisfies (a) soft and pliable hand characteristics together with (b) a low level of discoloration or deterioration under the influence of ultraviolet irradiation or exposure to exhaust gases of motor vehicles or nitrogen oxide gases, for example and (c) little change of its excellent initial hand and structure after long wear and exposure to the influences mentioned.

When manufactured by others using conventional methods, the resulting synthetic leather not only discolors as well as loses its strength, but also loses its initial excellent hand characteristics after wearing for a long time as an apparel material or after repeated laundering and dry cleaning, ironing, or exposure to ultraviolet rays or nitrogen oxide gases, for example. Especially in the case of synthetic suede, the excellence of the napped surface appearance and the so-called "writing effect" of fingers marks is much influenced by deteroration of the polyurethane elastomer binding the filaments or fibers.

It has already been proposed to incorporate a specific hindered amino group within a polyurethane elastomer. And we have previously proposed a composite sheet material comprising a fibrous sheet which is impregnated and/or is coated with a polyurethane elastomer containing a sterically hindered amino group in its molecule (U.S. Pat. No. 4,302,493).

But it is still required to suppress the paper-like hand of certain synthetic leathers of the prior art and to improve flexibility while keeping high density, and to reduce the discoloration, deterioration and unfavorable changes of the composite sheet material mentioned to a great degree.

Accordingly, it is an object of this invention to provide a novel method for producing a composite sheet material without a paper-like hand and having high flexibility and also high density, together with high resistance against discoloration and deterioration after long usage and under the various influences mentioned above.

The foregoing and other objects of this invention are accomplished by a method for producing a composite sheet material which comprises impregnating and/or coating a fibrous sheet with a mixture of (A) a polyurethane elastomer containing a sterically hindered amino group within its molecular chain, (B) a compound selected from the group consisting a polybasic acid and its derivatives consisting of a halide, a metal salt and an ammonium salt wherein one or more hydrogen atoms remain unreacted, the amount of (B) being within the range of 0.8–5 molar equivalents relative to the sterically hindered amino group, and (C) a solvent for polyurethane elastomer (A), and subjecting the resulting material to a wet-coagulation treatment.

We have surprisingly found that the method of this invention makes it possible to provide a composite sheet material which has not only soft and pliable hand characteristics but also high resistance against discoloration and deterioration.

Further, this combination makes it possible to provide a composite sheet material which has a dense and elaborate structure, and an excellent smoothness and appearance on its surface.

In the method of this invention, addition of polybasic acids and/or specific derivatives thereof to the specific polyurethane elastomer (namely, a polyurethane having a sterically hindered amine within its molecular chain), plays an important role, not only in preventing the particular polyurethane elastomer from being reduced in its resistance against discoloration and deterioration to the sheet, but also in giving soft and pliable hand characteristics as well as dense and elaborate structure to the composite sheet material.

The polybasic acid of this invention should contain either an inorganic or organic acid and may be selected from phosphoric acid, phosphorous acid, pyrophosphoric acid, sulfuric acid, sulfurous acid, thiosulfuric acid, oxalic acid, malonic acid, succinic acid, fumaric acid, maleic acid, glutaric acid, adipic acid, phthalic acid, ethylenediaminetetraacetic acid, citric acid, glutamic acid, pyromellitic acid, trimellitic acid, and other polycarboxylic acids.

The metal of the metal salt of the polybasic acid of this invention may be selected from lithium, the group consisting of sodium, potassium, magnesium, calcium, and so on.

The derivative of a polybasic acid used in this invention has one or more hydrogen atoms remaining unreacted.

An inorganic polybasic acid or derivatives thereof can preferably be used in this invention.

Also a mixture of two or more compounds selected from polybasic acids and derivatives thereof can be used.

For purposes of this invention the polybasic acids and derivatives thereof should be used in a range of 0.8–5 molar equivalents, preferably 0.8–2 molar equivalents relative to the sterically hindered amino group contained in the polyurethane. Employment of the polybasic acid or derivative thereof outside this range should be avoided because it causes unfavorable hydrolysis of the polyurethane elastomer during the wet-coagulating step.

The polybasic acids and derivatives thereof may be mixed with the polyurethane and solvent for polyurethane in any stage selected from (a) any state of preparing the polyurethane elastomer and (b) after preparation of the polyurethane elastomer. It is most favorable to carry out this mixing step soon after preparation of the polyurethane elastomer is completed. The polyurethane elastomer of this invention may be prepared, for example, by a single-step process, namely the polymeric diol, the organic polyisocyanate and the chain extenders, and if necessary, the chain terminator may be reacted at the same time. It is also possible to employ the so-called "prepolymer method", wherein a prepolymer obtained by the reaction of a polymeric diol and an organic polyisocyanate is chain-extended by adding a chain extender.

The sterically hindered amine compound may be added at any reaction stage to obtain the polyurethane elastomer containing a sterically hindered amino group. In order effectively to incorporate the sterically hindered amine compound within the molecular chain, it is preferable to add the sterically hindered amine compound at an early reaction stage.

Difunctional sterically hindered amine derivatives are additionally used in the manufacture of the polyol component and the latter can then be reacted further with the isocyanate component, as is customary, or the sterically hindered amine compound is used as a chain extender or is mixed with a sterically hindered amine-free chain extender. It is also possible to prepare, using the sterically hindered amine-containing components in a separate step, a prepolymer which is then reacted further with the sterically hindered amine-free components.

Further, the monofunctional sterically hindered amine derivative is used as a chain terminator or is mixed with a sterically hindered amine-free chain terminator. The preferred sterically hindered amino groups contained in the polyurethane elastomer are those having the following Formula (I):

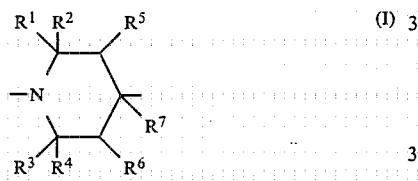

wherein $R^1$, $R^2$, $R^3$ and $R^4$ are the same or different, each denoting an alkyl group containing 1-12 carbon atoms, an alicyclic group containing 3-12 carbon atoms, or an aralkyl group containing 7-12 carbon atoms, $R^1$ and $R^2$ being independent or bonded to form a 5-12-membered alicyclic ring, and $R^3$ and $R^4$ being independent or bonded to form a 5-12-membered alicyclic ring; $R^5$ and $R^6$ are the same or different, each denoting hydrogen, an alkyl group containing 1-12 carbon atoms or an aromatic group containing 6-12 carbon atoms; $R^7$ denotes hydrogen, an alkyl group containing 1-12 carbon atoms, an alicyclic group containing 3-12 carbon atoms, an aromatic group containing 6-12 carbon atoms, an aralkyl group containing 7-12 carbon atoms, or a cyano group.

The sterically hindered amine compounds used in order to obtain the polyurethane elastomer containing a sterically hindered amine group represented by the above formula (I) in its molecule may be preferably selected from:
2,2,6,6-tetramethyl-4-aminopiperidine,
2,2,6,6-tetramethyl-4-hydroxypiperidine,
2,3,6-trimethyl-2,6-diethyl-4-aminopiperidine,
2,3,6-trimethyl-2,6-diethyl-4-hydroxypiperidine,
2,3-dimethyl-2-ethyl-4-amino-1-azaspiro[5,5]undecane
2,3-dimethyl-2-ethyl-4-hydroxy-1-azaspiro[5,5]undecane,
1,2,2,6,6-pentamethyl-4-aminopiperidine,
1,2,2,6,6-pentamethyl-4-hydroxypiperidine,
1,2,3,6-tetramethyl-2,6-diethyl-4-aminopiperidine,
1,2,3,6-tetramethyl-2,6-diethyl-4-hydroxypiperidine,
1,2,3-trimethyl-2-ethyl-4-amino-1-azaspiro[5,5]undecane,
1,2,3-trimethyl-2-ethyl-4-hydroxy-1-azaspiro[5,5]undecane,
1-benzyl-2,2,6,6-tetramethyl-4-aminopiperidine,
1-benzyl-2,2,6,6-tetramethyl-4-hydroxypiperidine,
1-benzyl-2,3,6-trimethyl-2,6-diethyl-4-aminopiperidine,
1-benzyl-2,3,6-trimethyl-2,6-diethyl-4-hydroxypiperidine,
1-benzyl-2,3-dimethyl-2-ethyl-4-amino-1-azaspiro[5,5]undecane,
1-benzyl-2,3-dimethyl-2-ethyl-4-hydroxy-1-azaspiro[5,5]undecane
1-allyl-2,2,6,6-tetramethyl-4-aminopiperidine,
1-allyl-2,2,6,6-tetramethyl-4-hydroxypiperidine,
1-allyl-2,3,6-trimethyl-2,6-diethyl-4-aminopiperidine
1-allyl-2,3,6-trimethyl-2,6-diethyl-4-hydroxypiperidine,
1-allyl-2,3-dimethyl-2-ethyl-4-amino-1-azaspiro[5,5]undecane,
1-allyl-2,3-dimethyl-2-ethyl-4-hydroxy-1-azaspiro[5,5]undecane,
1-(2-hydroxyethyl)-2,2,6,6-tetramethyl-4-aminopiperidine,
1-(2-hydroxyethyl)-2,2,6,6-tetramethyl-4-hydroxypiperidine,
1-(2-hydroxyethyl)-2,3,6-trimethyl-2,6-diethyl-4-aminopiperidine,
1-(2-hydroxyethyl)-2,3,6trimethyl-2,6-diethyl-4-hydroxypiperidine,
1-(2-hydroxyethyl)-2,3-dimethyl-2-ethyl-4-amino-1-azaspiro[5,5]undecane
1-(2-hydroxyethyl)-2,3-dimethyl-2-ethyl-4-hydroxy-1-azaspiro[5,5]undecane
N-(1,2,2,6,6-pentamethylpiperidyl-4)hydrazine,
N,N-bis-(1,2,2,6,6-pentamethylpiperidyl-4)hydrazine,
N,N,N'-tris-(1,2,2,6,6-pentamethylpiperidyl-4)hydrazine,
1,2,2,6,6-pentamethyl-4-aminoxypiperidine and derivatives of the above described compounds, whose piperidine-rings are substituted at 3,4 and/or 5 positions with substituents denoted by $R^5$, $R^6$ and $R^7$ of Formula (I). In addition to the hindered amine compounds described above, this invention includes derivatives of them which are formed by substituting at least one functional hydrogen atom with —(RO)$_n$H and/or —(COR'CORO)$_m$H where R and R' represent an organic diol residue and an organic dicarboxylic acid residue respectively.

Where the sterically hindered amine compound is monofunctional, the amount of usage is restricted to obtain a polyurethane elastomer having a desirable molecular weight because it plays the role of a chain terminator. 2–20 mol%, preferably 2–15 mol%, more preferably 2–12 mol% of the chain extender and terminator may be employed in the practice of this invention. Other monoamines or monoalcohols may also be employed as chain terminators.

Where the sterically hindered amine compound is difunctional, its amount is not specifically restricted, but favorably 2–30 mol%, more favorably 2–20 mol%, most favorably 2–12 mol% of chain extenders may be employed in this case.

Where the sterically hindered amine compound is trifunctional, use of an excessive amount brings about increased viscosity or sometimes gelation. Accordingly, it is used in an amount of 2–12 mol%, based upon the mols of chain extenders. It is, of course, possible to use various types of sterically hindered amine compounds at the same time.

The polymeric diol, which is a component of the polyurethane elastomer of this invention, is hydroxy-terminated at both ends of molecule and has a molecular weight of more than 500, preferably 800–4000, it preferably has a melting point below about 70° C., and is preferably selected from the group consisting of polyester glycol, polyether glycol, polyester ether glycol, polyacetal glycol, polybutadiene glycol, and so on. Representative polymeric diols may include polyethylene adipate glycol, polypropylene adipate glycol, polytetramethylene adipate glycol, polyhexamethylene adipate glycol, polycaprolactone glycol, polyethylene oxide glycol, polypropylene oxide glycol, polytetramethylene oxide glycol and mixtures thereof. A polymeric diol prepared by co-polymerization may also be employed in this invention.

The organic polyisocyanate, which is a component of the polyurethane elastomer of this invention, is preferably selected from the group consisting of phenylene diisocyanate, tolylene diisocyanate, diphenylmethane-4,4'-diisocyanate, diphenyldimethylmethane-4,4'-diisocyanate, naphthylene diisocyanate, diphenyl diisocyanate, ethylene diisocyanate, tetramethylene diisocyanate, hexamethylene diisocyanate, lysine diisocyanate, isophorone diisocyanate, dicyclohexylmethane-4,4'-diisocyanate, dicyclohexyldimethylmethane-4,4'-diisocyanate, xylylene diisocyanate, and so on, and mixtures thereof. A polyisocyanate and polyhydroxyl compound, and a polyisocyanate obtained by trimerization of said organic diisocyanate may also be employed in this invention. The organic diisocyanate is preferred. An aromatic diisocyanate and an alicyclic diisocyanate are more preferred. The chain extender, which is a component of the polyurethane elastomer of this invention, is preferably a low molecular weight compound having two functional groups which can react with organic polyisocyanate, such as glycols, diamines, aminoalcols, a hydrazine and/or its derivatives and water.

Glycols which can be used as the chain extender are, for example, ethylene glycol, propylene glycol, butane glycol, neopentyl glycol, cyclohexane glycol, 1,4-bis(β-hydroxyethoxy)benzene, N,N-bis(β-hydroxyethyl)aniline, xylene glycol, diethylene glycol, triethylene glycol, and so on, and mixtures thereof. Ethylene glycol, propylene glycol, 1,4-butane glycol, and 1,4-bis(β-hydroxyethoxy)benzene are more preferred.

Diamines which can be used as the chain extender are aromatic diamines such as p-phenylene diamine, m-phenylene diamine, tolylene diamine, naphthylene diamine, 4,4'-diamino-diphenylmethane, 4,4'-diaminodiphenylether, 4,4'-diamino-diphenylthioether, 4,4'-diaminodiphenylsulfone, 4,4'-diamino-3,3'-dimethyldiphenylmethane, 4,4'-diamino-3,3'-dichlorodiphenylmethane, 4,4'-diaminodiphenyldimethylmethane, and so on; aliphatic diamines and alicyclic diamines, such as ethylene diamine, propylene diamine, methanediamine, isophorone diamine, cyclohexylene diamine, 4,4'-diaminodicyclohexylmethane, 4,4'-diamino-3,3'-dimethyldicyclohexylmethane, xylylene diamine, and so on, and mixtures thereof. Aromatic diamine and alicyclic diamine are preferred, and 4,4'-diaminodiphenylmethane, tolylene diamine, 4,4'-diaminodicyclohexylmethane, and 4,4'-diamino-3,3'-dimethylcyclohexylmethane, are more preferred.

The solvent for the polyurethane elastomer of this invention is not restricted in nature so long as it is capable of dissolving the polyurethane elastomer. Suitable solvents include dimethylfomamide, dimethylacetamide, hexamethylphosphoramide, dimethylsulfoxide, diethylformamide, dioxane, tetrahydrofuran, o-chlorophenol and mixtures thereof. Among these, dimethylformamide, dimethylacetamide and dimethylsulfoxide are preferred.

The concentration of polyurethane elastomer in the mixture of polyurethane elastomer, a solvent therefor and a polybasic acid or derivative thereof is generally 5–50%, preferably 5–25%, and more preferably 6–20% by weight of said mixture.

The fibrous sheet material which may be employed in the method of this invention may be a woven fabric, a knitted fabric or a non-woven fabric, and preferably may be formed of superfine filaments or fibers. The expression "superfine" as used herein means below about 0.5 denier, preferably below 0.1 denier.

The fibrous sheet material which is formed of superfine filaments or fibers, preferably bundles thereof, gives a supple touch and ease of handling to a composite sheet material. A polyester or polyamide fiber, preferably a polyethylene-terephthalate fiber may be employed in the practice of this invention.

Various methods exist for manufacturing a composite sheet material by impregnating and/or coating a fibrous sheet with the polyurethane elastomer solution having polybasic acids and/or derivatives thereof and then by wet-coagulating the resulting sheet. Impregnating and coating methods can be varied in diverse ways known to those skilled in the art. Impregnating and coating methods are exemplified by dipping, doctor-blading, extruding, spraying, brushing, and roller-coating.

The impregnated and/or coated fibrous sheet should be wet-coagulated. In order to carry out this wet-coagulation, the impregnated and/or coated fibrous sheet is preferably bathed or treated by immersing or spraying with a non-solvent which is miscible with the solvent of the polyurethane elastomer, and which can dissolve neither polyurethane elastomer nor the fibers, in any convenient manner, to precipitate the impregnating and/or coating polyurethane elastomer.

A useful precipitant for the impregnant is water or methanol, as it is or added a small amount of solvent for the polyurethane elastomer and/or the known adjusting agent for controlling the porous structure of the polyurethane elastomer. The preferred precipitant is water. If the dry-coagulation is employed in place of the wet-coagulation in the method of this invention, the resulting composite sheet material has very poor flexibility.

The composite sheet material prepared in accordance with the method of this invention can be napped, embossed and top-dressed to enhance its hand and appearance by conventional procedures.

This invention is further illustrated by the following Examples in which a composite sheet material impregnated and/or coated with the polyurethane elastomer is evaluated by actual measurements. These Examples are intended to be illustrative but not to limit the scope of the invention, which is defined in the appended claims. The following test methods and procedures will be referred to in the Examples:

Flexibility: measured by the so-called "Clark method" which is described in Japanese Industrial Standard (JIS) L 1079. The value of flexibility is defined as the length in mm and a composite sheet with 0.85 mm thickness having a favourable flexibility has a flexibility value of 66–80 mm.

Smoothness and Surface Appearance: smoothness on the surface and excellence of surface appearance are judged, each in 5 degress. A high number shows good quality.

Weathering Deterioration Test: a sample is irradiated by use of a Sunshine Weather-O-Meter manufactured by Suga Testing Machine Co. Inc., for 100 hrs. at 60°–70° C. and exposed to air containing 70% moisture.

Tensile Strength: a sample (20×100 mm) is measured by use of a Tensilon UTM-III-100 tester, manufactured by Toyo Baldwin Co. Inc.

Abrasion: tested by using the Shiefer Abrasion Testing Machine. The surface of the napped sheet is abraded by use of a Shiefer abrasion tester manufactured by San-ei Sokki Co., Inc., using a nylon brush abradant. The angular velocity of the abradant is 59.5 rpm, the angular velocity of the specimen is 61.5 rpm, and the vertical pressure is 8 lbs. After 60 cycles of abrasion of the specimen, weight loss is measured. In general, a sheet with high density shows a low weight loss; a high number shows considerable deterioration of polyurethane elastomer.

Surface Appearance after 3 months' Wear: jumpers of each specimen were sewn and worn for 3 months. Wearability was judged by surface appearance as well as by shape retention at seams, collars, cuffs, and hemlines—in five degrees. A high number indicates good wearability.

Further, in the Examples, abbreviations will be used in the interest of brevity. The abbreviations and their meanings are listed hereinafter.

PTMG polyteramethylene oxide glycol
PCL polycaprolactone glycol
PEA polyethylene adipate glycol
PBA polybutylene adipate glycol
MDI diphenylmethane-4,4'-diisocyanate
$H_{12}$MDI dicyclohexylmethane-4,4'-diisocyanate
MBA 4,4'-diaminodiphenylmethane
$H_{12}$MBA 4,4'-diaminodicyclohexylmethane
EG ethyleneglycol
PG 1,2-propanediol
DBA dibutylamine
DMF N,N-dimethylformamide Sterically hindered amino groups of this invention listed in Table 1 are shown as their starting materials which react with polyurethane elastomer intermediate. The abbreviations and their formulae are as follows.

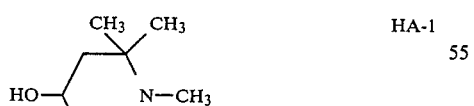
HA-1

HA-2

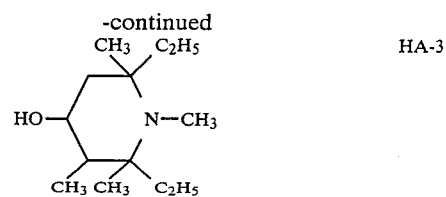
HA-3

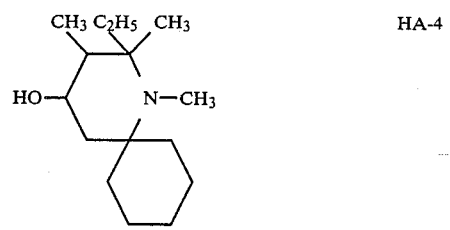
HA-4

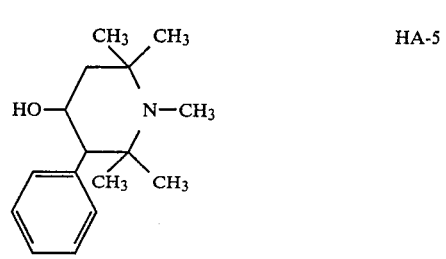
HA-5

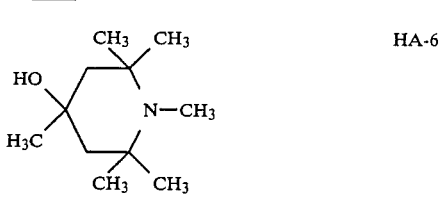
HA-6

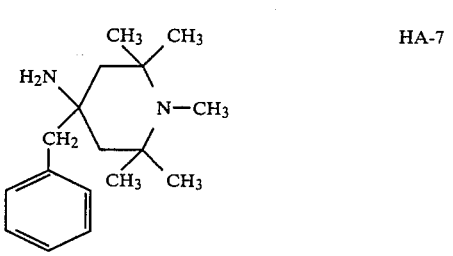
HA-7

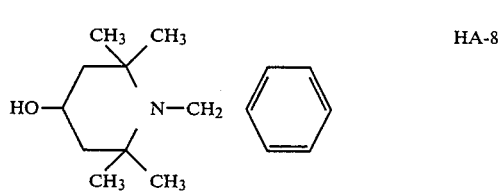
HA-8

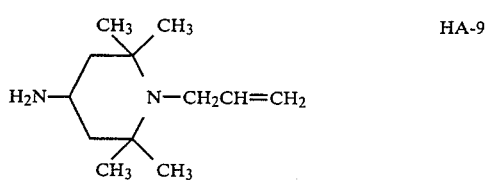
HA-9

EXAMPLES 1–13, AND COMPARISONS 1–9

A non-woven polyethylene terephthalate web was made from islands-in-a-sea type staple fibers of 3.4 denier, 51 mm in length, 5 crimps/in., drawn at a ratio of 2.3, which comprised 50 parts of islands component of said polyethylene terephthalate and 50 parts of sea component of polystyrene, said islands component being distributed as 16 islands-in-a-sea components when viewed as a cross section of the fiber. The steps of carding and cross-lapping were used in making the web. Subsequent needle punching produced a non-woven fabric. The non-woven fabric was immersed in a 20% aqueous solution by weight of polyvinylalcohol, dried and its sea component (polystyrene) was extracted with perchloroethylene to yield a non-woven fabric comprising superfine denier fibers (0.2 denier).

An isocyanate intermediate called a "prepolymer" was prepared by reaction of 1 mol of polymeric diols consisting of 80% by weight of PTMG having molecular weight of 2040 and 20% by weight of PCL having molecular weight of 1980, 2 mols of MDI and 0.09 mols of HA-1 for 1.5 hr. at 80° C., and was dissolved in DMF to yield a solution of 50% by weight.

A DMF solution of MBA and DBA (molar ratio: 98:2) was added to a 50% solution of the "prepolymer" and was reacted for 20 hrs. at room temperature. 1.0 molar equivalent of active hydrogen atom of MBA and DBA to the isocyanate group of prepolymer is employed in the above-mentioned chain-extending reaction. The content of nitrogen, which originated from sterically hindered amino groups within molecular chain of polyurethane elastomer, was about $6.0 \times 10^{-2}$% by weight.

After completing the reaction the solution was diluted with DMF to give a 13.5% solution and phosphoric acid, whose amount was 1.0 molar equivalent of sterically hindered amino group, was added to said solution. The non-woven fabric obtained by the method described above was immersed in the polyurethane elastomer solution, squeezed between rollers, coagulated with water for 1 hour, treated with hot water at 80° C. to extract the solvent and polyvinylalcohol, dried, sliced to a thickness of 1.1 mm and buffed to nap the sheet. The napped sheet, which had a thickness of 0.85 mm, was dyed in dyeing equipment referred to as "circular", manufactured by Hisaka Works Co. Ltd., of Japan, said sheet being passed repeatedly through a venturi nozzle for 1 hour at 125° C. together with an aqueous solution containing 2% o.w.f. of a disperse dye. A napped sheet having a density of 0.280 g/cm$^3$ was obtained by finish brushing the dyed sheet.

The napped sheet of Examples 2-13 and Comparisons 1-9 were obtained in the same manner as explained above, except for using at least one different condition relating to diamine-extended polyurethane elastomers, sterically hindered amine compounds, acids and concentration of polyurethane elastomer, as shown in Table 1.

Examples 1-9 should be compared with Comparisons 1-9.

EXAMPLES 14-17 AND COMPARISONS 19-12

One mol of polymeric diols consisting of 50% by weight of PTMG having a molecular weight of 2040 and 50% by weight of PCL having a molecular weight of 1980, 3 mols of MDI, 1.85 mols of EG and 0.1 mol of HA-2 were dissolved in dimethylformamide to give a 50% by weight solution and were reacted for 20 hrs. at 40° C. With rise in viscosity, said solution was diluted with DMF to give a 30% by weight DMF solution of a polyurethane elastomer having a viscosity of 810 p. at 20° C.

DMF and phosphoric acid were added to said solution in the same manner as explained in Example 1 to give a 12.0% by weight solution of polyurethane elastomer.

The napped sheets of Examples 14-17 and Comparisons 10-12 were obtained in the same manner as explained above except for using at least one different condition relating to diol-extended polyurethane elastomers, sterically hindered amine compounds, acids and concentration of polyurethane elastomer, as shown in Table 1.

Example 14 should be compared with Comparisons 10-11.

Example 17 should be compared with Comparison 12.

The properties of the napped sheets of Examples 1-17 and Comparisons 1-12 are shown in Table 1. The results reported in Table 1 explicitly show that the napped sheets of this invention, obtained from a solution of a polyurethane elastomer, which has a specific sterically hindered amino group within the molecular chain, in the presence of specific amount of polybasic acid and/or its derivatives, have the following superior properties compared to the sheet of Comparisons:

(a) A dense and elaborate structure (as is shown in high density and pertinent pliability).
(b) A soft and supple touch as are shown as low values both in flexibility and in 20% tensile strength.
(c) A good surface smoothness.

Further, said initially superior properties of the sheet of this invention change less in mechanical properties, discoloration and abrasion resistance after dry cleaning treatment, succeeding exposure to a Weather-O-Meter and after long actual wear.

EXAMPLE 18 AND COMPARISON 13

The unsliced sheet of Example 1 was sliced into 1.5 mm thickness to produce a base sheet material for a coated leather. A coating material obtained by mixing 3% of carbon black into a 25% DMF solution of the polyurethane elastomer of Example 1 was applied to said base sheet material in a thickness of 0.5 mm, was wet-coagulated with water for 30 min., the solvent was then extracted with hot water for 30 min., and the product was dried for 1 hr. at 100° C. to produce a synthetic leather. For comparison, a synthetic leather was obtained in the same manner, except using an unsliced sheet of Comparison 1 and a polyurethane elastomer of Comparison 1 (Comparison 13). The surface smoothness of both the synthetic leathers after extension, which is one of the most important properties in making shoes, was tested in a curved surface smoothness by a dome-plasticity tester manufactured by San-ei Sokki Co. Inc., of Japan. As is shown in Table 2, the sheet of this invention is superior. Further, both synthetic leathers were exposed to the effects of a Weather-O-Meter for 50 hrs. and evaluations were made of surface crack resistances by measuring the number of strokes required to cause cracks to occur, using a flexometer in accordance with JIS K 6545. The results are shown in Table 2. The values in Table 2 explicitly show that surfaces obtained by using polyurethane elastomers of this invention have remarkably improved crack resistance.

TABLE 1

| | Composition of Solution for Impregnation | | | | | | | Properties of Composite Sheet Materials | | | | | | | |
|---|---|---|---|---|---|---|---|---|---|---|---|---|---|---|---|
| | Polyurethane elastomer | | | | Hindered amine compound | Acid | | | Initial Properties | | | | Smoothness and Surface Appearance (class) | Properties after Drycleaning and Exposure to WOM* | | Surface Appearance after 3 months wear (class) |
| | Polymeric diol (wt %) | Organic diisocyanate | Chain extender | | | Compound | Molar ratio to Hindered amine | Concentration of PU elastomer | Apparent Density (g/cm) | 20% Tensile Strength (Kg/cm) | Flexibility (mm) | Abrasion (mg) | | Flexibility (mm) | Abrasion (mg) | Discoloration (class) |
| Example 1 | PTMG (80) PCL (20) | MDI | MBA | | HA-1 | Phosphoric acid | 1.0 | 13.5 | 0.280 | 2.12 | 68 | 8.2 | 5 | 71 | 14.3 | 5 | 5 |
| Example 2 | PTMG (80) PCL (20) | MDI | MBA | | HA-1 | Phosphoric acid | 0.8 | 13.5 | 0.276 | 2.19 | 70 | 9.1 | 5 | 73 | 14.8 | 5 | 5 |
| Example 3 | PTMG (80) PCL (20) | MDI | MBA | | HA-1 | Phosphoric acid | 5 | 13.5 | 0.273 | 2.30 | 78 | 8.8 | 4 | 80 | 16.3 | 4 | 4-5 |
| Example 4 | PTMG (80) PCL (20) | MDI | MBA | | HA-1 | Sulfuric acid | 1.0 | 13.5 | 0.278 | 2.09 | 72 | 8.3 | 5 | 76 | 14.9 | 5 | 5 |
| Example 5 | PTMG (80) PCL (20) | MDI | MBA | | HA-1 | Sulfuric acid | 0.8 | 13.5 | 0.276 | 2.10 | 73 | 8.7 | 5 | 79 | 16.1 | 5 | 5 |
| Example 6 | PTMG (80) PCL (20) | MDI | MBA | | HA-1 | Pyrophosphoric acid 2 sodium salt | 2.5 | 13.5 | 0.270 | 2.28 | 77 | 9.3 | 4 | 81 | 17.3 | 4 | 4 |
| Example 7 | PTMG (80) PCL (20) | MDI | MBA | | HA-1 | Adipic acid | 1.0 | 13.5 | 0.278 | 2.16 | 70 | 8.1 | 5 | 73 | 15.2 | 5 | 5 |
| Example 8 | PTMG (80) PCL (20) | MDI | MBA | | HA-1 | Oxalic acid | 1.0 | 13.5 | 0.277 | 2.10 | 69 | 8.3 | 5 | 72 | 14.4 | 5 | 5 |
| Example 9 | PTMG (80) PCL (20) | MDI | MBA | | HA-1 | Pyromellitic acid 2 sodium salt | 2.0 | 13.5 | 0.269 | 2.23 | 79 | 9.0 | 4-5 | 83 | 16.8 | 4-5 | 4-5 |
| Comparison 1 | PTMG (80) PCL (20) | MDI | MBA | | HA-1 | Formic acid | 1.0 | 13.5 | 0.265 | 2.42 | 83 | 9.9 | 3 | 85 | 18.8 | 4 | 3 |
| Comparison 2 | PTMG (80) PCL (20) | MDI | MBA | | HA-1 | Acetic acid | 1.0 | 13.5 | 0.266 | 2.36 | 81 | 10.3 | 3-4 | 84 | 18.2 | 4 | 3 |
| Comparison 3 | PTMG (80) PCL (20) | MDI | MBA | | HA-1 | Acetic acid | 5 | 13.5 | 0.263 | 2.32 | 85 | 12.1 | 3 | 88 | 21.2 | 3 | 2-3 |
| Comparison 4 | PTMG (80) PCL (20) | MDI | MBA | | HA-1 | Hydrochloric acid | 1.0 | 13.5 | 0.260 | 2.43 | 88 | 10.9 | 3 | 89 | 17.0 | 3-4 | 2-3 |
| Comparison 5 | PTMG (80) PCL (20) | MDI | MBA | | HA-1 | p-Toluene Sulphonic acid | 1.1 | 13.5 | 0.261 | 2.39 | 89 | 10.5 | 3-4 | 88 | 17.3 | 3-4 | 3 |
| Comparison 6 | PTMG (80) PCL (20) | MDI | MBA | | HA-1 | Phosphoric acid | 0.1 | 13.5 | 0.271 | 2.21 | 80 | 9.9 | 4 | 82 | 24.2 | 3 | 2-3 |
| Comparison 7 | PTMG (80) PCL (20) | MDI | MBA | | HA-1 | Phosphoric acid | 10 | 13.5 | 0.273 | 2.13 | 79 | 12.6 | 3-4 | 84 | 28.3 | 3-4 | 3 |
| Comparison 8 | PTMG (80) PCL (20) | MDI | MBA | | HA-1 | none | — | 13.5 | 0.277 | 2.45 | 82 | 7.3 | 5 | 83 | 31.0 | 2 | 2 |
| Comparison 9 | PTMG (80) PCL (20) | MDI | MBA | | none | none | — | 13.5 | 0.279 | 2.44 | 84 | 6.5 | 5 | 81 | 42.5 | 1 | 1 |
| Example 10 | PTMG | MDI | MBA | | HA-3 | Phosphoric acid | 1.0 | 14.0 | 0.285 | 2.24 | 76 | 6.3 | 5 | 78 | 12.6 | 5 | 4-5 |
| Example 11 | PTMG (70) PEA (30) | H12MDI | H12MBA | | HA-4 | Phosphoric acid | 1.0 | 14.0 | 0.288 | 2.01 | 63 | 8.9 | 5 | 65 | 9.3 | 5 | 5 |
| Example 12 | PTMG (80) PBA (20) | MDI | MBA | | HA-7 | Phosphoric acid | 1.0 | 14.0 | 0.283 | 2.21 | 74 | 7.2 | 5 | 76 | 14.8 | 4-5 | 4-5 |
| Example 13 | PTMG (70) PEA (30) | MDI | MBA | | HA-9 | Phosphoric acid | 1.0 | 14.0 | 0.280 | 2.16 | 72 | 7.3 | 5 | 73 | 9.9 | 5 | 5 |
| Example 14 | PTMG (50) | MDI | EG | | HA-2 | Phosphoric acid | 1.0 | 12.0 | 0.258 | 2.03 | 74 | 9.9 | 5 | 75 | 13.2 | 5 | 5 |

TABLE 1-continued

| | Composition of Solution for Impregnation | | | | | | | Properties of Composite Sheet Materials | | | | | | | |
|---|---|---|---|---|---|---|---|---|---|---|---|---|---|---|---|
| | Polyurethane elastomer | | | | Acid | | | Initial Properties | | | | Properties after Drycleaning and Exposure to WOM* | | | Surface Appearance after 3 months wear (class) |
| | Polymeric diol (wt %) | Organic diiso-cyanate | Chain extender | Hindered amine compound | Compound | Molar ratio to Hindered amine acid | Concentration of PU elastomer | Apparent Density (g/cm) | 20% Tensile Strength (Kg/cm) | Flexibility (mm) | Abrasion (mg) | Smoothness and Surface Appearance (class) | Flexibility (mm) | Abrasion (mg) | Discoloration (class) | |
| Comparison 10 | PTMG (50) PCL (50) | MDI | EG | HA-2 | Hydrochloric acid | 1.0 | 12.0 | 0.249 | 2.14 | 81 | 12.0 | 3 | 82 | 14.8 | 4 | 3 |
| Comparison 11 | PTMG (50) PCL (50) | MDI | EG | HA-2 | none | — | 12.0 | 0.250 | 2.08 | 77 | 11.3 | 4-5 | 83 | 33.0 | 3 | 3 |
| Example 15 | PTMG (50) PBA (50) | MDI | EG (50) PG (50) | HA-5 | Phosphoric acid | 1.0 | 14.0 | 0.285 | 2.37 | 77 | 5.9 | 5 | 79 | 11.3 | 5 | 5 |
| Example 16 | PTMG (60) PEA (40) | MDI | EG | HA-6 | Phosphoric acid | 1.0 | 14.0 | 0.295 | 2.40 | 78 | 6.3 | 5 | 80 | 12.0 | 5 | 5 |
| Example 17 | PCL | MDI | EG | HA-8 | Phosphoric acid | 1.0 | 14.0 | 0.291 | 2.63 | 82 | 4.0 | 5 | 83 | 6.3 | 5 | 4 |
| Comparison 12 | PCL | MDI | EG | HA-8 | Formic acid | 1.0 | 14.0 | 0.283 | 2.84 | 90 | 4.2 | 4 | 92 | 13.4 | 3-4 | 3 |

*WOM: Weather-O-Meter

TABLE 2

| | Surface Smoothness when Being Extended | Crack Resistance (No. of Strokes of Crack Occurrence) | |
|---|---|---|---|
| | | No Irradiation | Irradiation of Weather-O-Meter after Drycleaning Treatment |
| Example 18 | Good | 790 × 10³ | 670 × 10³ |
| Comparison 13 | Medium | 680 × 10³ | 220 × 10³ |

We claim:

1. A method for producing a composite sheet material which comprises impregnating and/or coating a fibrous sheet with a mixture of (A) a polyurethane elastomer containing a sterically hindered amino group within its molecular chain, (B) a compound selected from the group consisting of a polybasic acid and its halide, metal salt and ammonium salt, wherein one or more hydrogen atoms remain unreacted, which amount of (B) is within the range of 0.8–5 molar equivalents relative to the sterically hindered amino group, and (C) a solvent for the polyurethane elastomer (A), and subjecting the resulting material to wet coagulation.

2. The method of claim 1, wherein the sterically hindered amino group has the Formula (I):

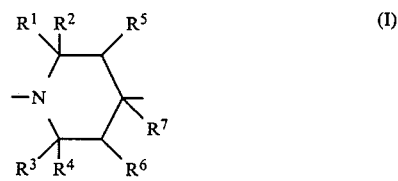

wherein $R^1$, $R^2$, $R^3$ and $R^4$ are the same or different, each denoting an alkyl group containing 1–12 carbon atoms, an alicyclic group containing 3–12 carbon atoms, or an aralkyl group containing 7–12 carbon atoms, $R^1$ and $R^2$ being independent or bonded to form a 5–12-membered alicyclic ring, and $R^3$ and $R^4$ being independent or bonded to form a 5–12-membered alicyclic ring; $R^5$ and $R_6$ are the same or different, each denoting hydrogen, an alkyl group containing 1–12 carbon atoms or an aromatic group containing 6–12 carbon atoms; $R^7$ denotes hydrogen, an alkyl group containing 1–12 carbon atoms; an alicyclic group containing 3–12 carbon atoms, an aromatic group containing 6–12 carbon atoms, an aralkyl group containing 7–12 carbon atoms, or a cyano group.

3. The method of claim 2, wherein said hindered amino group is selected from the group consisting of groups having the Formula (I), wherein $R^1$, $R^2$, $R^3$ and $R^4$ are the same or different alkyl groups selected from methyl, ethyl, and propyl groups, and $R^1$ and $R^2$ and/or $R^3$ and $R^4$ are bonded to form a 5-,6-, or 12-membered alicyclic ring, wherein $R^5$ and $R^6$ are substituents selected from the group consisting of hydrogen, methyl, ethyl, propyl, phenyl and substituted phenyl groups, and wherein $R^7$ is a substituent selected from the group consisting of hydrogen, methyl, ethyl, benzyl and cyano.

4. The method of claim 1, wherein the compound (B) is inorganic.

5. The method of claim 1, wherein the compound (B) is selected from the group consisting of phosphoric acid, a phosphoric halide, a metal salt of phosphoric acid, sulfuric acid, a sulfuric halide, and a metal salt of sulfuric acid.

6. The method of claim 1, wherein the compound (B) is organic.

7. The method of claim 1, wherein the amount of compound (B) is within the range of 0.8–2 molar equivalents relative to the sterically hindered amino group.

8. The method of claim 1, wherein the mixture of the polyurethane elastomer (A), the compound (B) and the solvent (C) is produced by mixing the compound (B) and a solution of the polyurethane elastomer (A) in the solvent (C) soon after formation of the elastomer (A) is completed.

9. The method of claim 1, wherein the solvent (C) is selected from the group consisting of dimethylformamide, diethylacetamide, and dimethylsulfoxide.

10. The method of claim 1, wherein the fibrous sheet comprises a non-woven fabric.

11. The method of claim 1, wherein the fibrous sheet comprises a woven fabric.

12. The method of claim 1, wherein the fibrous sheet comprises a knitted fabric.

13. The method of claim 1, wherein the fibrous sheet is formed of superfine filaments or fibers.

14. The method of claim 13, wherein the denier of the superfine filaments or fibers is below 0.5.

15. The method of claim 13, wherein the denier of the superfine filaments or fibers is below 0.1.

16. The method of claim 15, wherein the fibrous sheet is formed of bundles consisting of superfine filaments or fibers.

17. The method of claim 15, which additionally comprises carrying out the step of forming naps consisting of superfine filaments or fibers on at least one surface of the composite sheet material.

* * * * *

UNITED STATES PATENT AND TRADEMARK OFFICE
CERTIFICATE OF CORRECTION

PATENT NO. : 4,535,009
DATED : 8/13/85
INVENTOR(S) : Minoru Tanaka; Hideo Nakamura and Shunji Mizuguchi It is certified that error appears in the above-identified patent and that said Letters Patent is hereby corrected as shown below:

Column 9, line 56, delete "19-12" and insert --10-12--.

Signed and Sealed this

Third Day of June 1986

[SEAL]

Attest:

DONALD J. QUIGG

Attesting Officer

Commissioner of Patents and Trademarks